May 19, 1925.  
C. G. KING  
BROOCH  
Filed June 26, 1924  
1,538,119  
2 Sheets-Sheet 1
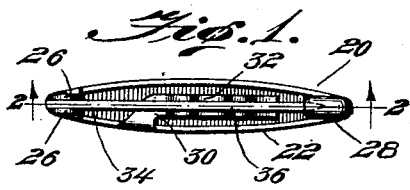
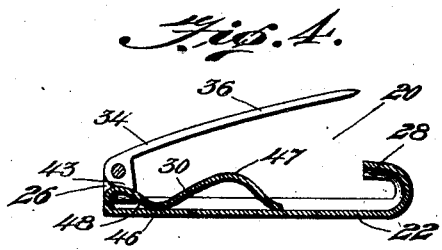
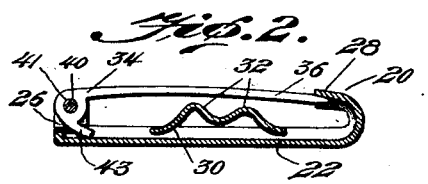
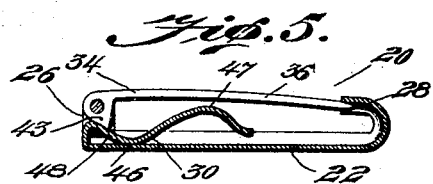
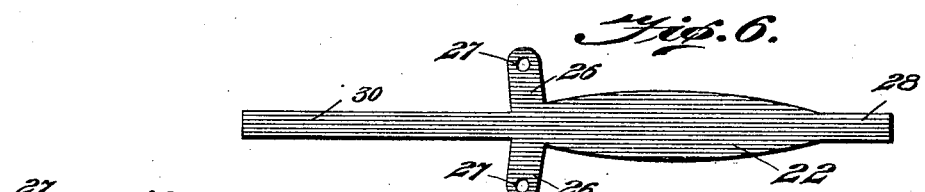
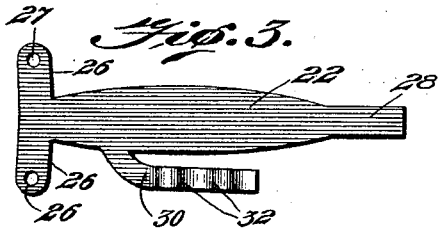
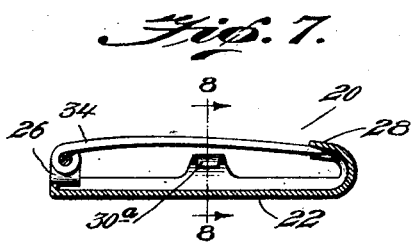
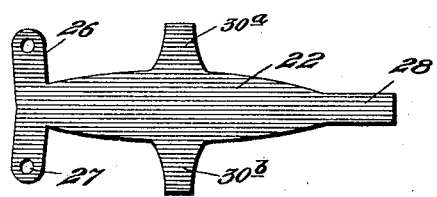
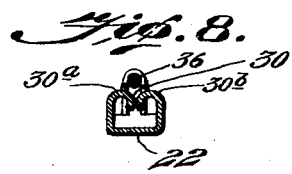
Inventor  
Clifford G. King  
By Thomas A. Jenckes Jr.  
Attorney May 19, 1925.  
C. G. KING  
BROOCH  
Filed June 26, 1924  
1,538,119  
2 Sheets-Sheet 2

Inventor  
Clifford G. King  
By Thomas A. Jenkes Jr.  
Attorney

Patented May 19, 1925.

1,538,119

UNITED STATES PATENT OFFICE.

CLIFFORD G. KING, OF PROVIDENCE, RHODE ISLAND.

BROOCH.

Application filed June 26, 1924. Serial No. 722,577.

*To all whom it may concern:*

Be it known that I, CLIFFORD G. KING, a citizen of the United States, residing at 62 Overhill Road, Providence, in the county of Providence and State of Rhode Island, have invented certain new and useful Improvements in Brooches, of which the following is a specification.

My invention relates to brooches or similar pins and its object is to improve and simplify the construction thereof.

My invention more specifically relates, in addition, to a blank for use in the manufacture of pins which may be shaped into and used either as a front plate or a back plate as will become more fully apparent.

My invention further relates to improvements in the process of manufacturing pins.

These and such other objects of my invention as may hereinafter appear will be best understood from a description of certain embodiments thereof such as are shown in the accompanying drawings.

In the drawings, Fig. 1 is a rear view of a pin employing my invention in assembled position.

Fig. 2 is a longitudinal sectional view taken along the line 2—2 of Fig. 1.

Fig. 3 is a plan view of the blank used in manufacturing the embodiment shown in Fig. 1.

Fig. 4 is a longitudinal sectional view of a modified form of my invention with the pin tongue open.

Fig. 5 is a view similar to Fig. 4 with the pin tongue closed.

Fig. 6 is a plan view of the blank used in the manufacture of the embodiment shown in Figs. 4 and 5.

Fig. 7 is a longitudinal sectional view of another modified form of my invention.

Fig. 8 is a cross sectionel view taken along the line 8—8 of Fig. 7.

Fig. 9 is a plan view of the blank used in the manufacture of the embodiment shown in Figs. 7 and 8.

Figure 10:
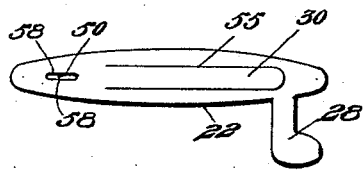
Fig. 10 is a plan view of the blank used in the manufacture of the embodiment shown in Fig. 12.

In the drawings, wherein like characters of reference indicate like parts throughout, 20 generally indicates a brooch in complete assembled condition. In the embodiments shown in Figs. 1–9 on Sheet 1 of the drawings, the blank 22 is later shaped in the course of its manufacture to form the front plate or body portion of the pin or brooch which may be ornamented in any suitable fashion. In the embodiments shown in Figs. 10–15 on Sheet 2 of the drawings, the blank 22 is employed to form the back plate of the pin, the front plate 24 usually employed in brooches or pins of this type being shaped as usual to contain the back plate 22. As will become apparent, the first step in the manufacture of the pin 20 normally comprises stamping out a flat blank 22, preferably elongated in shape as shown in Figs. 3, 6, 9, 10 and 13. Said blank 22 preferably has portions or extensions adapted to be shaped so as to form pin tongue pivoting means near one end thereof, pin tongue point retaining means or a catch near the opposite end thereof and portions or extensions adapted to be shaped so as to form bridge means to cooperate with the pin tongue to firmly retain the pin to the fabric when the pin is assembled. Said portions or extensions are shaped up from the blank as will be described to form pin tongue pivoting means, catch means and bridge means. Where the blank 22 is employed as the front plate of the pin as shown in Figs. 1–9 and 16–18, said blank 22 may in addition be cupped during manufacture and may have its outside surface suitably ornamented. Where the blank 22 is employed as the back plate of a pin as shown in Figs. 10–15, the various portions or extensions are shaped to form the pin tongue pivoting means, the pin point retaining means and bridge means respectively, the plate itself however, preferably being left flat so as to be conveniently contained within the additional front plate 24 suitably cupped and ornamented where desired.

Referring more specifically to the various embodiments shown, in Figs. 1–3, the blank 22 is cut preferably in the oval shape as shown, having the extensions 26 extending at diametrically opposite points from each side thereof near one end thereof. Said extensions or ears 26 are preferably provided with the pivot holes 27. An extension 28 projects preferably longitudinally from the opposite end thereof. Said extension 28 is adapted to be cupped over or shaped to form in the finished article the pin point retaining means or catch 28. The spring bridge extension 30 in this embodiment projects at first obliquely outward from one side of the body portion of the blank 22 and then for a distance approximately parallel therewith. As shown in Fig. 3 said bridge is preferably corrugated as at 32 after stamping. To shape up the pin for assembly, the extensions 26 are preferably bent up perpendicularly to the plane of the body portion to form the ears 26, the extension 28 conveniently bent over to form the catch 28, and the spring bridge extension 30 bent over on top of the body portion 22 until it is approximately parallel to the plane thereof. These operations are correspondingly easier when the blank 22 is cupped and transversely concaved as shown in Figs. 1 and 2. The pin tongue 34 having the usual pin blade 36 and pivot hole 41, is suitably mounted between the bent up ears 26 by inserting the pivot pin 40 through the pivot hole 41 in the pin tongue, and the holes 27 in the ears 26. The pin tongue 34 is provided with the usual cam 43 near the pivot portion thereof to cooperate to keep the pin tongue 34 within the catch 28. It is obvious that when the pin tongue is inserted through the fabric, and locked in position in the catch 28, thereby attaching the pin or brooch to the fabric, that a portion of the fabric will be retained between said pin tongue blade 36 and the corrugated spring bridge 30 to more effectively retain the pin or brooch 20 to the fabric.

The embodiment of my invention shown in Figs. 4–6 is very similar to the embodiment already shown in Figs. 1–3, the only difference being in the shape and position of the spring bridge extension 30. Instead of extending laterally from one side of the blank or front plate 22, it projects longitudinally from the blank from the same end of the blank as the pin tongue pivoting means 26 project. The pin is shaped in identically the same manner as in the embodiment shown in Figs. 1–3, the spring bridge extension 30 however being bent over so as to lie underneath the pin tongue blade 36 within the front plate 22 as shown in Figs. 4 and 5. On mounting the pin tongue 34 between the ears 26 it is obvious that the cam 43 bearing against the spring bridge 30 of this embodiment performs an added function. The spring bridge 30 is preferably crooked so as to have a fulcrum point 46 always bearing against the front plate 22, and a curved portion 47 extending upwardly towards the pin tongue blade 36. This embodiment is shown in Fig. 4 with the pin tongue 34 in open position. As the pin tongue blade 36 is lowered, the cam 43 will strike against that portion 48 of the spring bridge 30 nearest the attached end thereof. The spring bridge being preferably bent to function as a lever of the first class having a fulcrum point 46 bearing against the front plate 22, as the pin blade tongue 36 is pressed down and the cam 43 bears against the portion or power arm 48 of the spring bridge 30 nearest the pivot, the weight arm or upward extension 47 will be raised so as to bind a layer of fabric between said raised weight arm 47 thereof and the pin tongue blade 36 when in closed position.

The embodiment shown in Figs. 7–9 differs from the embodiments hitherto described merely in the position of the bridge 30. The bridge 30 in this embodiment comprises two extensions 30ª and 30ᵇ extending from diametrically opposite sides of the blank 22 near the central portion thereof. As the blank 22 is shaped the extensions 30ª and 30ᵇ are bent over as shown in Figs. 7 and 8 to form a bridge 30 to bind a layer of fabric between said bridge 30 and pin tongue blade 36. It is obvious that in this embodiment the bridge 30 is usually less resilient than in the other embodiment shown.

Figure 11:
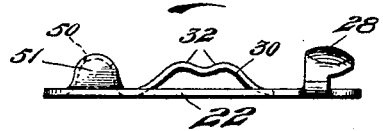
Fig. 11 is a side elevation of the blank shown in Fig. 10 after it has been shaped in manufacture.
Figure 12:
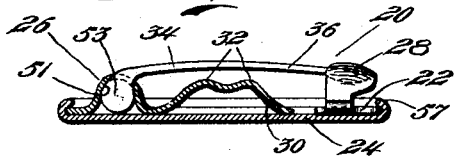
Fig. 12 is a longitudinal sectional view of a modified form of my invention employing the blank shown in Figs. 10 and 11.

As explained, in the embodiments shown in Figs. 10–15 on Sheet 2 of the drawings, the blank 22 is normally used as the back plate of the pin. The embodiment shown in Figs. 10–12 is practically identical with the embodiment shown in Figs. 13–15 except for the means employed to mount the pin tongue thereon.

In the embodiment shown in Figs. 10–12, the catch or pin point retaining means extension 28 preferably projects laterally from the side of the blank near one end thereof. A hole 50 is cut near the opposite end of the blank which may be shaped to form a socket 51 to receive the pivot end of the pin tongue, which in this embodiment is preferably shaped in the form of a disk 53. A spring bridge extension 30 may project either from the end or a side of the blank 22 as shown in the embodiments hitherto described. In the embodiment shown however, I have made a hair pin slit 55 extending longitudinally of the blank from the pivot socket 51, thereby forming the spring bridge extension 30, which may be raised up and corrugated as previously explained, as shown in Figs. 11 and 12. After the back plate 22 is stamped as explained, the pin point retaining means or catch 28 is suitably shaped, the portion of the blank 22 near the pivot hole 50 is shaped to form the socket 51 and the spring bridge extension is raised up and corrugated as shown in Figs. 11 and 12. As explained, in this embodiment the pin tongue 34 has a pivot portion which comprises the disk 53. After the back plate or blank 22 is shaped as shown in Fig. 11, the pin tongue blade 36 is inserted through the pivot hole 50, the disk 53 of the pin tongue 34 being retained in the socket 51. The back plate 32 is then placed within the front plate 24, and the edges are bent over the front plate 24 to form the lips 57 which firmly retain the back plate 22 to the front plate 24. It is obvious that the front plate 24 will press the disk 53 into the socket 51. The hole 50 preferably comprises a narrow slot having the longitudinal sides 58. These sides 58 guide the pin tongue blade 36 so that it may pivot substantially in one plane and can readily be inserted within the catch 28. It is obvious that in this embodiment the pin tongue pivoting means 26, the pin tongue point retaining means or catch 28 and the spring bridge extension 30 function in similar fashion to those of the embodiments hitherto described, the layer of fabric being retained as usual between the pin tongue blade 36 and the bridge 30.

Figure 13:
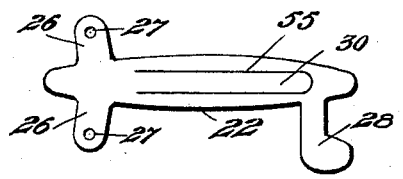
Fig. 13 is a plan view of the blank used in the manufacture of the embodiment shown in Fig. 15.
Figure 14:
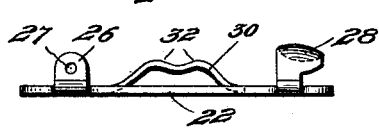
Fig. 14 is a side elevation of the blank shown in Fig. 13 after it has been shaped in manufacture.
Figure 15:
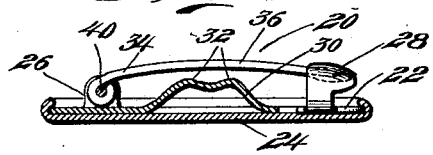
Fig. 15 is a longitudinal sectional view of a modified form of my invention employing the blank shown in Figs. 13 and 14.

As explained the embodiment shown in Figs. 13-15 differs only from the embodiment shown in Figs. 10-12 in the construction of the pin tongue pivoting means 26, the means employed in this embodiment being identical in construction to that employed in the embodiments shown on Sheet 1 of the drawings, and comprising the projections 26 projecting from the sides of the blank 22 at diametrically opposite points near the end of the blank 22 opposite from the catch extension 28. These are bent over perpendicularly to the blank 22 to form the ears 26, and the pin tongue 34 is mounted as usual therein.

Figure 16:
Fig. 16 is a plan view of the bridge blank used in the manufacture of the embodiment of my invention shown in Fig. 18.
Figure 18:
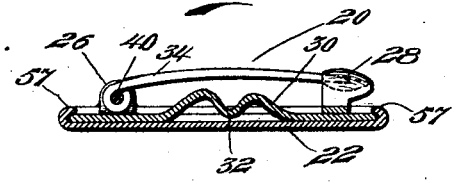
Fig. 18 is a longitudinal sectional view of a modified form of my invention employing the blank shown in Figs. 16 and 17.
Figure 17:
Fig. 17 is a side elevation of the bridge blank shown in Fig. 16 after it has been shaped in manufacture.

The embodiment shown in Figs. 16-18, is practically identical in construction with the embodiments shown in the drawings on Sheet 1. The blank 22 having the pin tongue pivoting means 26 and pin tongue point retaining means or catch 28 is stamped as hitherto explained. The spring bridge 30 in this embodiment comprises a separate member. After the blank 22 has been shaped as hitherto explained, a bridge blank 30, longer than the blank 22, having its ends preferably slightly enlarged as at 60 is stamped out. This spring bridge blank 30 is then corrugated as usual as at 32 and as it is preferably constructed out of resilient material it may be conveniently slipped into position, the enlarged cone shaped ends 60 conveniently fitting within the cupped ends of the front plate 22. It is obvious that the pin tongue pivoting means 26 and catch 28 may be integrally attached to the bridge member 30 rather than to the front plate 22 if desired. It is believed that the method employed in manufacturing this embodiment, comprising forming a spring bridge blank of longer length than the brooch blank when finished, corrugating it, and inserting it in position within the turned over ends 57 of the front plate 22 presents a new principle in the manufacture of pins or brooches.

It is understood that my invention is not limited to the specific embodiments shown or processes described and that various deviations may be made therefrom without departing from the spirit and scope of the appended claims.

What I claim as new and desire to secure as Letters Patent is:

1. A blank for use in the manufacture of pins comprising a member having a portion thereof adapted to be shaped so as to form pin tongue pivoting means, a portion thereof adapted to be shaped so as to form pin tongue point retaining means, and a portion thereof adapted to be shaped to form bridge means adapted to cooperate with the pin tongue to firmly retain the pin to the fabric, when the pin is assembled.

2. A blank for use in the manufacture of pins, comprising a member having an extension projecting therefrom adapted to be shaped so as to form pin tongue pivoting means, an extension projecting therefrom adapted to be shaped so as to form pin tongue point retaining means, and an extension projecting therefrom adapted to be shaped so as to form bridge means adapted to cooperate with the pin tongue to firmly retain the pin to the fabric, when the pin is assembled.

3. A blank for use in the manufacture of pins comprising a flat elongated member having a portion thereof adapted to be shaped so as to form pin tongue pivoting means, a portion adapted to be shaped so as to form pin tongue point retaining means, and a portion adapted to be shaped so as to form spring bridge means adapted to cooperate with the pin tongue to firmly retain the pin to the fabric, when the pin is assembled.

4. A blank for use in the manufacture of pins, comprising a flat elongated member having an extension projecting therefrom adapted to be shaped so as to form pin tongue pivoting means, an extension projecting therefrom adapted to be shaped so as to form pin tongue point retaining means, and an extension projecting therefrom adapted to be shaped so as to form spring bridge means adapted to cooperate with the pin tongue to firmly retain the pin to the fabric, when the pin is assembled.

5. A blank for use in the manufacture of pins, comprising a flat elongated member having extensions projecting at diametrically opposite points near one end thereof adapted to be shaped to form ears for pivotally mounting a pin tongue thereon, an extension projecting therefrom near the opposite end thereof adapted to be shaped to form a pin tongue point catch, and an extension projecting therefrom adapted to be shaped to form a bridge.

6. A blank for use in the manufacture of pins, comprising a flat elongated member having extensions projecting at diametrically opposite points near one end thereof adapted to be shaped to form ears for pivotally mounting a pin tongue thereon, an extension projecting therefrom near the opposite end thereof adapted to be shaped to form a pin tongue point catch and an extension projecting longitudinally from the same end as the ears extension adapted to be bent over and shaped to form a bridge.

7. In a pin, the combination of a plate having an extension projecting from one end thereof and extending within the pin to form a spring bridge bent to contact the plate at a fulcrum point and a pin tongue pivotally mounted on the pin, having a cam surface attached thereto near the pivot point thereof adapted to contact the portion of the spring bridge between the fulcrum point and the inner end thereof, whereby on lowering of said pin tongue, said cam surface may raise up the outer end of said spring bridge to bite the fabric between said pin tongue and spring bridge.

8. In a pin, the combination of a plate having a catch integrally attached thereto at one end thereof, pin tongue pivoting means integrally attached thereto, and a different portion thereof shaped to form a bridge, and a pin tongue pivoted on said pin tongue pivoting means, said pin tongue being adapted to cooperate with said bridge to firmly retain the pin to the fabric.

9. In a pin, the combination of a plate having a catch integrally attached thereto at one end thereof, pin tongue pivoting means integrally attached thereto, and a portion thereof shaped to form a spring bridge, and a pin tongue pivoted on pin tongue pivoting means, said pin tongue being adapted to cooperate with said bridge to firmly retain the pin to the fabric.

10. In a pin, the combination of a front plate, a back plate contained therein, a pin tongue pivoted on said pin, and bridge means extending from said back plate adapted to cooperate with said pin tongue to firmly retain the pin to the fabric.

11. In a pin, the combination of a front plate, a back plate contained therein, a pin tongue pivoted on said back plate, and bridge means extending from said back plate adapted to cooperate with said pin tongue to firmly retain the pin to the fabric.

12. In a pin, the combination of a front plate having curved up ends, a pin tongue pivoted on the pin and a spring bridge member contained within said front plate and having the ends thereof contacting the curved up ends of said front plate adapted to cooperate with said pin tongue to firmly retain the pin to the fabric.

13. In a pin, the combination of a front plate having curved up ends, a pin tongue pivoted thereon and a corrugated spring bridge member contained within said front plate and having the ends thereof contacting the curved up ends of said front plate adapted to cooperate with said pin tongue to firmly retain the pin to the fabric.

14. In a pin, the combination of a front plate having curved up ends, pin tongue pivoting means attached thereto near one end thereof and a pin catch attached thereto near the opposite end thereof, a pin tongue pivoted on said pin tongue pivoting means and a corrugated spring bridge member contained within said front plate and having the ends thereof contacting the curved up ends of said front plate adapted to cooperate with said pin tongue to firmly retain the pin to the fabric.

15. The herein described improved process of manufacturing pins which comprise stamping a blank of longer length than the pin plate, corrugating it, and bending the edges of the pin plate over to contain said corrugated blank within said plate, whereby said blank may form a bridge.

In testimony whereof I affix my signature.

CLIFFORD G. KING.